(12) United States Patent
Ungaro et al.

(10) Patent No.: US 10,846,973 B2
(45) Date of Patent: Nov. 24, 2020

(54) DEVICE FOR HANDLING AND DISTRIBUTING PACKAGES

(71) Applicant: SANTA LUCIA PHARMA APPS S.R.L., Gragnano Trebbiense (IT)

(72) Inventors: Andrea Patrick Ungaro, Gragnano Trebbiense (IT); Giorgio Pavesi, Gragnano Trebbiense (IT); Fulvio Rudello, Gragnano Trebbiense (IT)

(73) Assignee: SANTA LUCIA PHARMA APPS S.R.L., Gragnano Trebbiense (IT)

( * ) Notice: Subject to any disclaimer, the term of this patent is extended or adjusted under 35 U.S.C. 154(b) by 22 days.

(21) Appl. No.: 16/090,736

(22) PCT Filed: Apr. 4, 2017

(86) PCT No.: PCT/IB2017/051906
§ 371 (c)(1),
(2) Date: Oct. 2, 2018

(87) PCT Pub. No.: WO2017/175122
PCT Pub. Date: Oct. 12, 2017

(65) Prior Publication Data
US 2019/0122480 A1 Apr. 25, 2019

(30) Foreign Application Priority Data
Apr. 4, 2016 (IT) .............................. UA2016A2287

(51) Int. Cl.
*G07F 11/52* (2006.01)
*B65G 33/02* (2006.01)

(52) U.S. Cl.
CPC .............. *G07F 11/52* (2013.01); *B65G 33/02* (2013.01)

(58) Field of Classification Search
CPC ........ B65G 33/02; B65G 33/06; B65G 33/04; G07F 11/16; G07F 11/64; G07F 11/50;
(Continued)

(56) References Cited

U.S. PATENT DOCUMENTS 3,731,841 A * 5/1973 Schlaf .................... G07F 11/64
221/75
6,361,263 B1 3/2002 Dewey et al.
(Continued)

FOREIGN PATENT DOCUMENTS

| CN | 102760330 A | 10/2012 |
|---|---|---|
| EP | 0913349 A1 | 5/1999 |
| IT | BL2004A000020 A | 8/2004 |

OTHER PUBLICATIONS

International Search Report and Written Opinion dated Jul. 7, 2017 from counterpart PCT App No. PCT/IB2017/051906.
(Continued)

*Primary Examiner* — Glenn F Myers
(74) *Attorney, Agent, or Firm* — Shuttleworth & Ingersoll, PLC; Timothy Klima

(57) ABSTRACT

A device for the accurate and efficient handling of objects, in particular packages, comprises a pick up group consisting of at least one toothed carrier bar and adapted to rotate according to two limit positions; in one of said positions, the bar disengages the packages; a handling group is provided, such as a main comb, with the function of moving the packages by pushing them when the carrier bar is in the working position.

17 Claims, 4 Drawing Sheets

(58) Field of Classification Search
CPC .......... G07F 11/36; G07F 11/42; G07F 11/46;
G07F 11/52; G07F 11/56; G07F 17/0092;
A47F 1/128; A47F 1/00
USPC .......... 414/331.01, 331.18, 331.12
See application file for complete search history.

(56) References Cited

U.S. PATENT DOCUMENTS

| | | |
|---|---|---|
| 8,478,441 B2 | 7/2013 | Liguori et al. |
| 2015/0008239 A1 | 1/2015 | Perkins |
| 2015/0235501 A1 | 8/2015 | Wang |
| 2016/0075033 A1 | 3/2016 | Soll et al. |

OTHER PUBLICATIONS

Chinese Office Action dated Jul. 20, 2020 from counterpart Chinese Patent Application No. CN201780034729.2.

\* cited by examiner

DEVICE FOR HANDLING AND DISTRIBUTING PACKAGES

This application is the National Phase of International Application PCT/IB2017/051906 filed Apr. 4, 2017 which designated the U.S.

This application claims priority to Italian Patent Application No. ITUA2016A002287 filed Apr. 4, 2016, which application is incorporated by reference herein.

SCOPE OF THE INVENTION

The present invention relates to a newly designed device for the accurate and efficient handling of objects.

Said device can find useful application in the context of more complex object handling, storage and distribution systems.

In particular, but not exclusively, said device can be used in the hospital and healthcare field in automatic warehouses for the handling, storage and distribution of drugs in unit dose contained in special packages made according to the prior art.

Health facilities must constantly face the need to administer the drugs provided by the prescribed therapies to their patients.

In particular, health facilities containing numerous beds subject to high inpatient turnover and housing patients in the acute phase of their disease (therefore subject to frequent changes in therapy) need procedural and/or technological instruments and/or methods that assist clinicians in the preparation step of the therapy to be administered. It is likewise important to have instruments to control the drug therapy in all those facilities providing health services with high clinical and economic value such as outpatient services, direct distribution of drugs, DH services, etc.

In recent years, moreover, for clinical, economic and logistical reasons, a new drug management methodology is being established in healthcare facilities which is based on the unit dose replenishment of drugs.

In many cases, handling, storing and dispensing single-dose packages is carried out by variously designed and manufactured automated machines. Among these are machines capable of dispensing single packages attached in continuous strips or bands which must be separated at the time of administration and others that dispense the packaged drug in doses sealed on all their sides and specially pierced on the centerline of the upper part to allow the support on pegs and consequently the automatic handling thereof. The proposed innovation object of the present document consists of a device and a method for storage and handling the packages produced according to the latter approach. The production process of these packages is prior art.

PRIOR ART

The automatic warehouses described in the literature generally consist of a structure—fixed or rotating on a rotatable carriage—on which a plurality of pegs are mounted in a substantially horizontal position, adapted to store the drug packages to form an N×M matrix, and of a similar "carrier" bar integral to a device which translates vertically and horizontally (only vertically in the case of rotating matrix) to reach all the drug storage positions. The movement of the latter component is controlled by a computer to which the coordinates of each bar constituting the matrix are known according to a technique known in the field of handling and storage of goods.

Through various mechanisms (described in summary hereinafter), the "carrier" bar is able to retrieve one or more drug packages from the warehouse pegs and send them to the intended use.

This type of automatic warehouse has some drawbacks that limit the applicability thereof.

Not uncommonly, for example, the size of these devices is incompatible with the installation in health facility environments. In fact, all prior art types of devices have a predefined storage space organization, which generally has a one-to-one ratio between warehouse bar and medicinal products managed. With this configuration, in order to intercept as many different medicinal products as possible in type, volume and number, the order of the N×M matrix and, consequently, the size of the device are increased.

In addition, the increase in some of the performance in terms of speed, reliability and accuracy in the discharge of therapies are features highly appreciated by the users of these systems.

One of the most interesting technological aspects of these devices and the subject of numerous innovation solutions is undoubtedly the mechanism for transferring the doses from the storage bar to the carrier bar.

The most commonly used technique consists in the use of spiral bars. In this context, each dose is accommodated on the bottom of the thread which constitutes the spiral so that one and only one dose can be accommodated in a valley of the bar. The translation of the doses is ensured by the rotation of the bars around their axis so that the thread side pushes the package into one of the two longitudinal directions.

The device described in patent no. EP0913349 of Oct. 14, 1997 provides for the passage of a package between two coaxial threaded bars rotating around their own axis jointed at the head through a tapered male-female coupling. The first bar is part of the rotatable storage matrix, the second bar instead is the "carrier" that is part of a manipulator device which translates vertically to reach all levels of the storage matrix. The "carrier" bar is also responsible for the rotary motion transmitted through the junction. The junction, moreover, is designed so as to create substantial continuity of the thread in the passage between the two bars so as to reduce obstacles to the translational movement of the doses.

A same solution is described in U.S. Pat. No. 6,361,263 of Dec. 10, 1999, which describes, as an ameliorative element, a thread with variable pitch in order to obtain the rotation and the spacing of the doses during their translation along the axis of the bar in order to obtain an improvement of the identification conditions of the dose itself with a barcode reader.

This type of solution has some drawbacks that make it difficult to use and manage, which drawbacks can be summarized as follows:

- manufacturing difficulty and cost of the threaded bars;
- inertial effects on the doses upon starting and stopping the axial rotation;
- sensitivity to the manufacturing conditions of the doses, in particular the hole: a small defect in the piercing of the doses may affect the handling thereof (e.g. the dose may become jammed between the two bars during their junction);
- requires remarkable precision during coupling: a small misalignment of the bar axes (a few tenths of a millimeter) can compromise the handling;

coupling fragility which may have discontinuities in which the doses become jammed, thus causing the rotation thereof integrally with the bar and consequent damage;

fragility of the smooth-threaded bar coupling in picking up from the storage unit which makes the package loading operation very sensitive to the calibrations of the working heights of mechanical parts and to the adjustment of the suction mechanism.

An alternative solution, which goes beyond the use of threaded bars, is described in patent no. ITBL20040020 of Aug. 1, 2004, which describes a comb transfer system for packages. In this case, both the pegs of the storage matrix and the "carrier" bar consist of toothed bars (between the grooves of which are arranged the packages to be handled) provided with a longitudinal cavity in which a comb is accommodated and slidable to lift, translate and deposit one or more packages. In said patent, the bar is joined at the head with the storage bar through a pneumatic actuation. When the two bars find this alignment, the two longitudinal cavities form a single comb passage compartment which can thus pass axially into the compartment until it brings to its grooves at the grooves of the toothed bar into which the packages to be handled are accommodated. A subsequent lifting of the comb releases the packages from the teeth of the bars, thus making their axial movement possible. The lowering of the comb at the grooves to be occupied on the toothed bars results in the desired storage translation.

This solution also has some drawbacks that make it little applicable in practice, and precisely:

implementation, since the mechanics subject to constructional tolerances in order to obtain the coupling with clearance provided for the comb sliding in the compartment of the threaded bar is further complicated by the fact that all the sliding mechanism has to work within a small space consisting of the size of the hole (which is subject to irregularities due to the production process) on the package to be handled (a little more than 1 cm in diameter);

the necessity of obtaining a continuous sliding compartment of the comb following the junction between the storage bar and the carrier bar makes the coupling accuracy between the two bars very critical, due to the possible formation of surface discontinuities at the interface which would make the sliding of the comb difficult;

component wear phenomenon, caused by the presence of contacting parts in mutual relative motion and the inability to use any type of lubricant to maintain the cleaning conditions required by the application together with the fact that systems like these are subject to continuous working cycles;

mechanical strength problems, given the small size of the resisting sections and the notches, it is necessary to verify the resistance to mechanical stress (peak load, bending) to which these components are subject.

In U.S. Pat. No. 8,478,441 of Mar. 19, 2008, the handling of the doses is ensured by an extensible telescopic arm provided, at its end, with a pair of suction cups that allow the transfer of the doses from the storage bar to the carrier bar which holds them up to the deposition thereof in designated locations of a cart means. The innovation of this solution mainly lies in automatically setting up the therapy of patients on board the same cart used by healthcare professionals for the administration of drugs to the patient bedside.

In this embodiment, before the package of drugs reaches its final destination, intermediate steps of the package itself are required that also provide instants in which the dose is not resting on supports but is retained by suction cups or dropped from a first support on another support. These steps are subject to considerable unpredictability and require accurate adjustments of the working heights of the individual components of the automated warehouse to ensure reliability and avoid any dispensing error.

Further examples of handling systems are described in EP 913 349, US 2016/075033 and US 2015/235501.

DESCRIPTION AND ADVANTAGES OF THE INVENTION

One object of the present invention is to provide a method and device for the accurate and efficient handling of objects, particularly in in single-dose packages.

More precisely, it is a desirable to handle the packages by means of a system that:

is not particularly expensive due to its constructive simplicity (very simple machining operations and with less critical dimensional tolerances);

makes the handling of the doses less prone to the geometric variability of the same due to the manufacturing process and to the fact that the packages themselves are not equivalent to rigid bodies but rather to deformable structures due to the production and handling method (for example, with the proposed innovation described, the phenomenon of the doses wrapping on the carrier spiral caused by the rotation of the same is prevented);

makes the inertial effects on the doses due to the pick up and stopping steps of the moving parts negligible;

together with methodological and process aspects described hereinafter, makes it possible to improve the performance in terms of speed and reliability in drug dispensing;

is designed and manufactured so as to reduce the overall dimensions of the automatic warehouse to increase the usability thereof even in small volume spaces;

eliminates any temporary storage structure and any step that involves the absence of a support on which the drug package rests by gravity until it reaches the final destination;

improves the usability of the automatic warehouse by the operators.

These and other objects are achieved with features as disclosed herein. The present disclosure also presents preferred and/or particularly advantageous aspects.

In particular, in a preferred embodiment of the present invention, the packages to be handled are supported by a plurality of toothed bars (also called storage bars), wherein each bar comprises, arranged on at least part of the working length thereof, a plurality of ridges and relative valleys transversal to the axis of the bar (preferably identical in shape and size); the ridges are placed at a constant distance, or pitch, from one another so as to form teeth.

The bar heads are further provided with a head hole for coupling with a carrier bar.

Each of these storage bars is supported by a dedicated support by means of suitable brackets and constrained to a fixed panel.

The mounting support of the storage bars is configured so that the bar itself, pushed towards the panel (for example, by the effect of coupling with the carrier bar), can reach a position in which it is free to rotate. The device thus described is entirely contained in a closed structure.

A pick up group, by means of one or more associated drives, is operable and configured to reach each storage bar according to the definition of their coordinates, according to the identification and management by means of a computer, according to known techniques in the field of handling and storage of goods.

According to a feature of the present invention, the above pick up group is provided with a carrier bar consisting of a section bar provided with a series of ridges and transversal valleys similar to those already described for the storage bars; in this case, the carrier bar has a valley more than the storage bar; this valley is required, as will be clarified hereinafter, to temporarily place the packages during the loading step of the same.

The carrier bar is driven, by means of motors means, to make a rotation with respect to its axis. The motor means used may consist, for example, of a stepping motor.

Moreover, the carrier bar is mounted on a slide which enables the rectilinear movement in the direction of the axis of the bar itself. The free end of the toothed carrier bar is provided with a conical abutment adapted to fit into the conical seats of the storage bars when the carrier bar and the storage bar are aligned and joined at the head. Moreover, the geometry of the conical abutment described allows transmitting the rotation movement of the carrier bar to the storage bar.

It follows that the carrier bar has the ability to perform two movements:
  a movement (with, for example, pneumatic actuation) of axial translation in the two directions of junction/detachment of the carrier bar head with the storage bar head with alignment ensured by the conical cavity whenever the management computer detects the storage bar supporting the packages to be handled or to which the packages are intended;
  movements of axial rotation that allow it to assume two limit positions, namely:
    a rest position, in which the teeth thereof are facing upwards to keep the packages in a known position;
    a working position, in which the carrier bar is rotated so as to expose the smooth side upwards, disengaging the packages of objects from the relative valleys; in this configuration, it is possible to slide the packages along the axis of the carrier bar.

Moreover, according to another feature of the present invention, a handling group is provided, such as a main comb, having the function of moving the packages by pushing them when the carrier bar is in the working position. This main comb is configured to overcome the carrier bar and is arranged in axis with respect to the same.

Said main comb is configured to perform two types of movements (actuated, for example, by means of electric motors or electro-pneumatic systems):
  A first movement of vertical translation, in which the main comb moves vertically so that its teeth are arranged sliding on the carrier bar to engage the packages supported thereby,
  A second movement of horizontal translation, in which the comb translates horizontally to position itself on the packages to be moved and to carry out the movement.

In a further formulation of the invention, an auxiliary comb is also provided, having the function of keeping the packages in position and preventing oscillations of the same during the rotation of the carrier bar in the transition between the rest position and the working position and vice versa. This auxiliary comb is placed off-axis with respect to the carrier bar (it works alongside the same by the entire length thereof) and is subject to a vertical movement (it lowers towards the packages to perform its function) actuated, for example, by means of an electro-pneumatic system.

All the parts described so far do not require special machining operations or particularly critical tolerances, which reduces the manufacturing costs and thus the overall cost of the warehouse according to one of the stated objects.

The intended task and the objects listed are fully achieved with the system for handling and transferring packages described hereinafter and by the innovative setup of some components of the automated warehouse considered as a whole.

In particular, it is contemplated to be able to reduce the overall dimensions of the current automatic dispensers through the following measures:
  the loading of the packages on the cabinet takes place through a loading area as described in the aforementioned patent no. U.S. Pat. No. 8,478,441 of Mar. 19, 2008 with front opening, so as not to have to consider the opening dimensions of the latter in the greatest dimension of the device;
  special entrances for maintenance operations are not required since all operations can be carried out from the front of the cabinet, due to the possibility of a complete opening of the front containment panel that makes each component of the automatic warehouse accessible to the operator (this also allows being able to install the equipment in a recess of the same size since no service entrances are required in addition to the front ones);
  the storage space can be contained and optimized due to the fact that, through a specific storage management algorithm, drugs are distributed within the warehouse area without any predefined order; the position of every single dose is processed and defined at the time of positioning. The predefined drug/storage bar mapping is overcome. In this way, each storage bar may be occupied by different drugs since the software stores the individual position of the package. This arrangement eliminates the locations not used because of the pegs dedicated to seldom-handled drugs;
  the increase in the number of possible positions on each storage bar, allowed by the fact that the geometry of the bars does not have the constructive limits of the threaded bar.

Speed and reliability are increased due to the introduction of the "patient bar" concept, i.e. a storage location reserved for an individual patient and which varies its contents in real time in terms of drug packages stored on the basis of the prescriptions that the cabinet receives through the management software application. In this way, at the time of dispensing, the drug packages are already grouped by patient in order to be quickly dispensed. In addition, compared to the prior art, with the proposed system it is possible to increase the number of packages that can be positioned on the handling and transfer device, thus increasing the number of packages that can be simultaneously handled.

Reliability (in terms of reducing dispensing errors caused by the dispersion of the package during handling) is considerably increased in the proposed solution due to the fact that, as will be clear hereinafter, at every instant of the handling process within the automatic warehouse, drug packages are adequately supported by suitable supports until the final destination is reached. For example, compared to some known solutions involving the passage of packages from the carrier bar to an intermediate support before being conveyed to the final destination, the proposed innovation described involves that packages are carried to destination directly by the carrier bar.

Moreover, the loading of the packages, in addition to overcoming the problems of smooth bar-carrier bar interface (e.g. spiral), involves the coupling between the loading bar and the carrier bar so that in the passage between the two there occur no situations in which the retention of the package is completely delegated to the suction cup mechanism.

The usability of the device is improved by virtue of the following aspects:
- reduction of drug pick up points by the operator (one drawer only);
- simplified operations through improved interface;
- light indicators on the warehouse panel to identify the operation in progress;
- control console located near the work areas;
- easily accessible and ergonomic drug pick up points (the drug pick up drawer, unlike the warehouse currently in use, opens outwards to facilitate access.

Again, the proposed system, unlike the previous versions, does not require intermediate elements to carry the doses from the carrier bar to the final destination: the drug packages are conveyed from the carrier bar by gravity to the end positions via a chute on which they are dropped directly by the carrier bar.

Said objects and advantages are all achieved by the method and apparatus for handling and distributing objects, object of the present invention, which is characterized by the appended claims.

BRIEF DESCRIPTION OF THE FIGURES

This and other features will become more apparent from the following description of some of the configurations, illustrated purely by way of example in the accompanying drawings.

DESCRIPTION OF THE INVENTION

Figure 1:
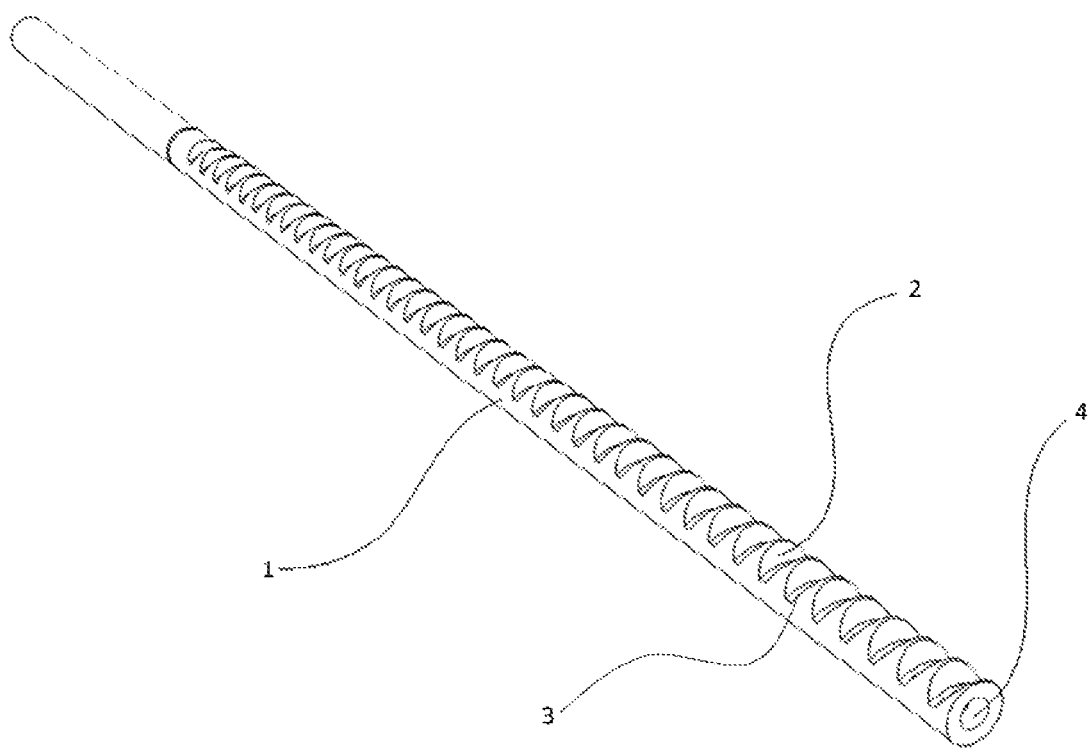
FIG. 1: shows a toothed bar, in particular the storage bar, of the present invention.

With particular reference to the figures, the invention is implemented in automatic devices for the distribution of pharmaceutical articles divided into unit doses or dosage units, hereinafter referred to as packages, to be handled.

Said unit doses or dosage units are supported by dedicated storage bars, indicated with reference numeral 1, extending substantially horizontally and in turn divided on a panel or matrix.

Panel, storage bars and respective doses are contained inside the closed structure and connected to the outside by means of front user access doors and/or automatic access doors, both of which are usually controlled access, so as to be protected from manual manipulations.

Therefore, the packages to be handled are supported by the plurality of toothed bars, positioned in a configurable manner on the rear panel, for example to form an N×M matrix.

An illustration of the above storage bar is shown in FIG. 1.

Each storage bar 1 consists of a bar provided with a plurality of ridges 2 and valleys 3, arranged transversely with respect to the axis of bar 1 and preferably having the same shape and size; said ridges 2 and valleys 3 are arranged on most of the working length of the storage bar 1 and at a constant distance (pitch) from each other, so as to form teeth.

The plurality of ridges 2 and valleys 3 thus form housings for product packages. The depth of the valleys is necessary to allow for the reliable positioning of the respective package, preferably it is less than half section of the section bar.

Each of these storage bars 1 is supported by a dedicated support by means of suitable brackets and constrained to a fixed panel. The mounting support of bars 1 is designed so that the bar itself, pushed towards the panel (for example, by the effect of coupling with the carrier bar), can reach a position in which it is free to rotate. The warehouse thus described is, as said, entirely contained in a closed structure.

Each storage bar 1 comprises a head hole 4 allowing coupling with a carrier bar, as is described hereinafter.

Figure 2:
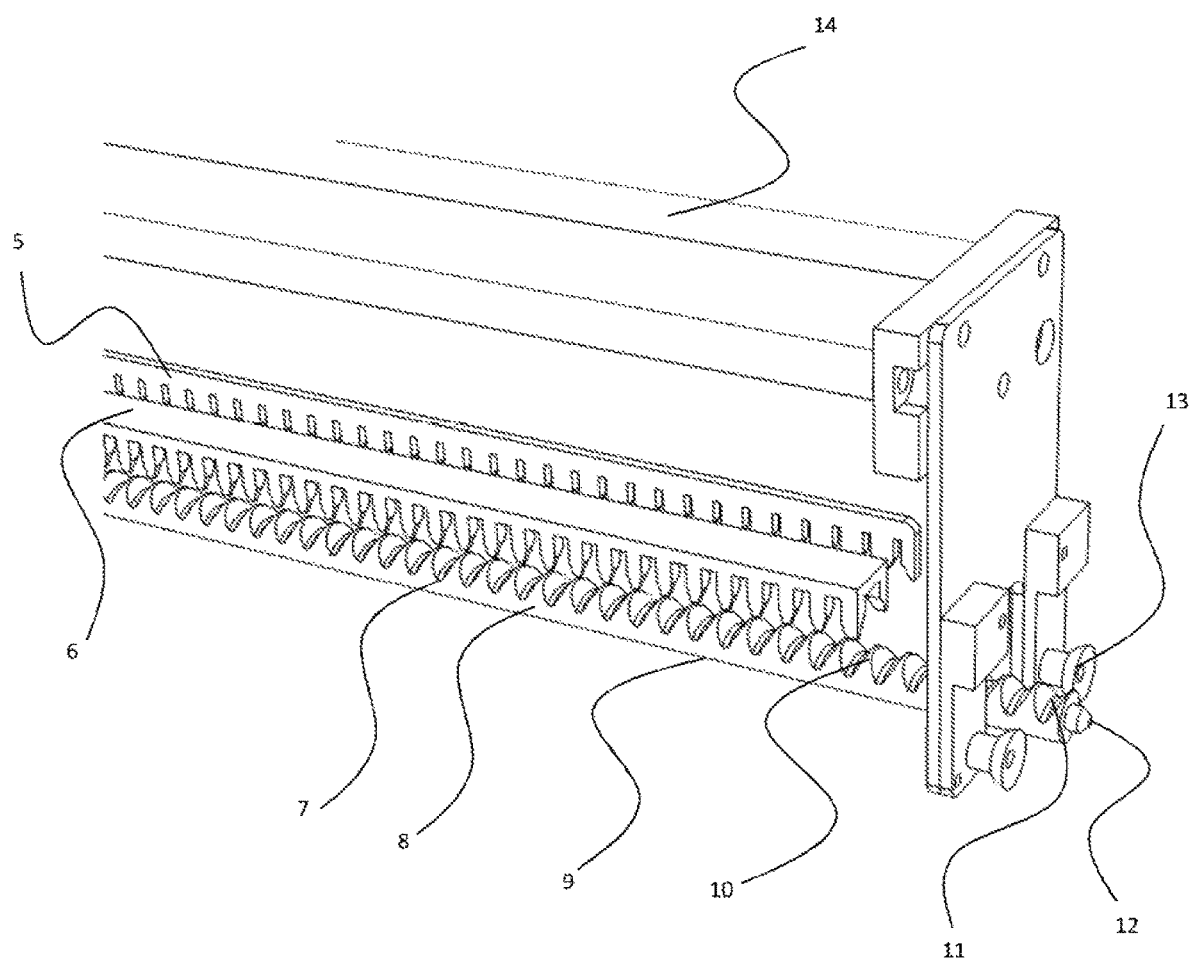
FIG. 2: shows the whole pick up and handling group, the first consisting of a toothed carrier bar, the second of a main comb, better described hereinafter.

With particular reference to FIG. 2, it shows the pick up group, the latter being operable so that it can reach each storage bar 1 according to the definition of its coordinates that a normal processor can define and manage, according to a technique already known in the field of good handling and storage.

Said pick up group is provided with at least one carrier bar, indicated with reference numeral 8 in the figure, which consists of a circular section bar also provided with a series of ridges 10 and valleys 7, transversely arranged with respect to the axis of the carrier bar 8, similar to those already described for the storage bars. Therefore, the carrier bar 8 also has teeth.

The plurality of ridges 10 and valleys 7 thus form housings for product packages. The depth of the valleys is necessary to allow for the reliable positioning of the respective package, preferably it is less than half section of the section bar.

With respect to the storage bar 1, the carrier bar 8 has an additional valley 11; this additional valley is necessary, as will be explained hereinafter, to temporarily place the packages during the loading step of the same.

The same carrier bar 8 is actuated by motor means and is configured to perform a rotation with respect to its axis. The motor means used may consist, for example, of a stepping motor. Moreover, the carrier bar 8 is mounted on a slide which enables the rectilinear movement in the direction of the axis of the bar itself.

The free end of the carrier bar 8 is provided with a conical abutment 12 adapted to fit into the corresponding conical seats 4 of the storage bars 1 when the carrier bar 8 and the storage bar 1 are aligned and joined at the head.

Moreover, the geometry of the conical abutment 12 described allows transmitting the rotation movement of the carrier bar 8 to the storage bar 1. In other words, the coupling is such as to ensure the rotational drag after the coupling of the two bars.

The carrier bar 8 is provided with the ability to perform two movements:
- A movement (with, for example, pneumatic actuation) of axial translation in the two directions of junction/detachment of the carrier bar 8 head with the storage bar 1 head with alignment ensured by the conical cavity 4 whenever the management computer detects the storage bar supporting the packages to be handled or to which the packages are intended;
- A movement of axial rotation that allows it to assume two positions:

rest position: teeth facing upwards to keep the packages in a known position;

working position: bar rotated so as to expose the smooth side upwards; in this configuration, it is possible to slide the packages along the axis of the carrier bar. It is noted that "upwards" identifies the bar portion adapted to support the single-dose package.

Figure 3:
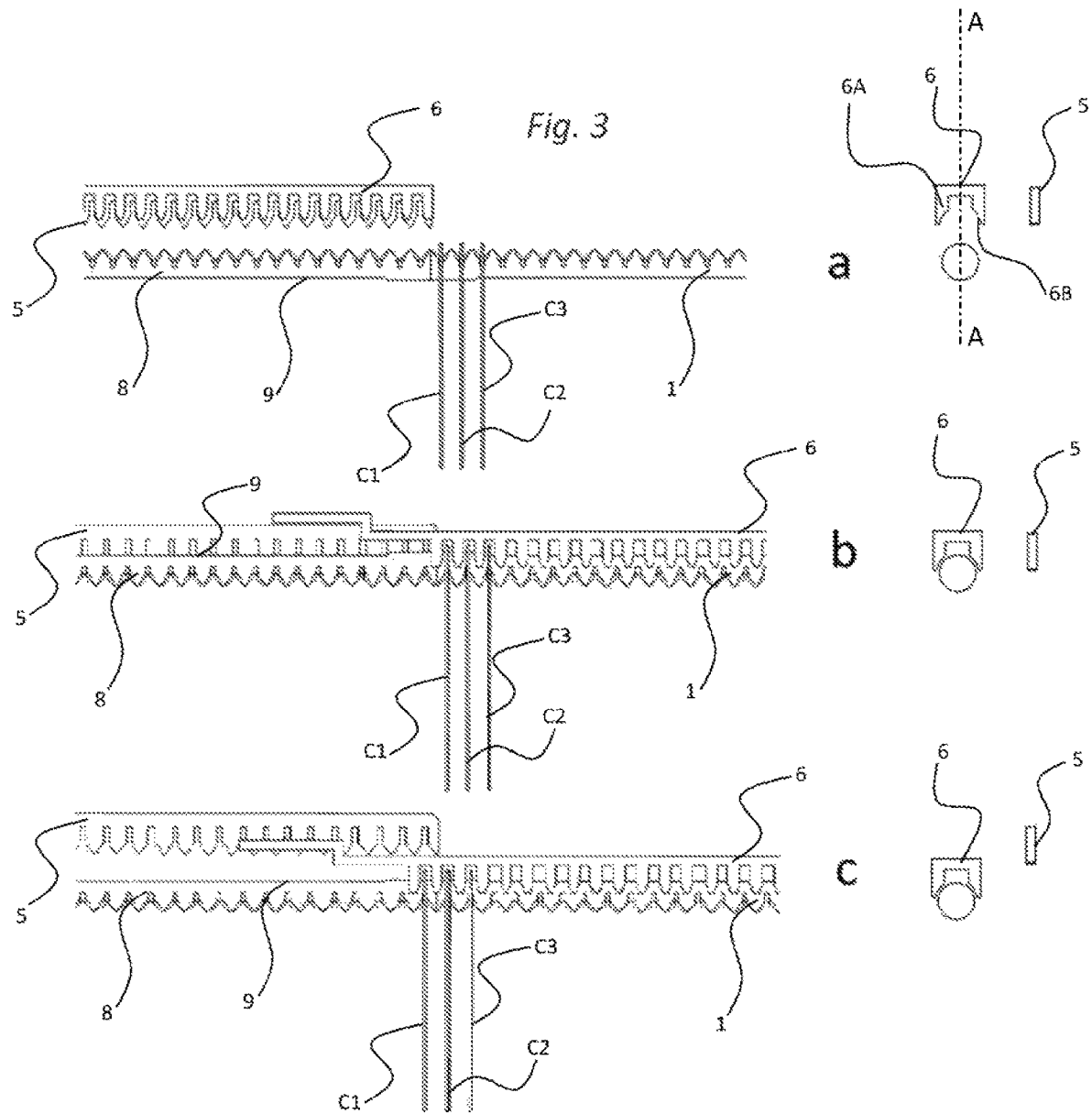
FIG. 3: shows the various operating coupling steps (a, b, c) between the bars and package handling.

In order to carry out the movement, that is, the translation along the axis constituted between the two bars, the storage and the carrier one, joined and aligned, the invention provides a handling group; in the present case and with reference to FIGS. 2 and 3, said handling group comprises at least one main comb 6.

Specifically, the main comb 6 is arranged in axis with respect to a vertical median plane AA passing by said carrier bar 8. As shown in FIG. 3, symmetrically arranged with respect to said median plane AA, said main comb 6 has a pair of separation elements 6A; said elements 6A are also repeated by the entire length of the comb so as to act as separation means adapted to keep packages C1, C2, C3 of the (storage or carrier) separate from one another when the carrier bar is in working position (and at the same time also the corresponding storage bar).

Moreover, and with reference to the front view in the first two representations in FIG. 3 showing the positions in which comb 6 is distant from the bars and approaching the bars, it is noted that elements 6A protrude towards the (storage or carrier) bar and their end portion is shaped so as to replicate the circular shape of the bar itself. Due to this configuration, it is possible to approach comb 6 close to the bar and ensure that the position of the packages is maintained also when the working position is already defined. In this way, the main comb 6 is suitable for taking charge of all the packages present on a bar and handling them when in the working position of said bars.

In greater detail, the main comb 6 is arranged to surmount the carrier bar 8, in an axis relative to the same, and is also configured to carry out two types of movements (actuated, for example, by electric motors or electro-pneumatic systems):

A first movement of vertical translation, in which the main comb 6 moves vertically so that its teeth are arranged sliding on the carrier bar to engage the packages supported thereby.

A second movement of horizontal translation, in which the comb translates horizontally:
to position itself on the packages to be handled
to carry out the movement.

An further comb is seen, referred to as auxiliary comb 5, which is movable and configured for keeping the packages in position and preventing oscillations of the same during the rotation of the carrier bar 8 in the transition between the rest position and the working position and vice versa.

In this case, it is a simple auxiliary comb 5 with straight teeth; the auxiliary comb 5 is positioned next to the bar with the teeth parallel to the median plane mentioned above; in this way, comb 5 is off-axis with respect to the carrier bar 8 and works sideways to the latter, and by at least part of the portion where its ridges and valleys are present.

Each tooth of the comb is spaced so that its teeth can be inserted between packages C1, C2, C3, . . . , Cn.

Moreover, said auxiliary comb 5 is configured to be able to carry out a vertical movement, i.e. it lowers towards the packages to perform its function; said vertical movement is actuated, for example, by means of an electro-pneumatic system.

The functions thereby whereby the new handling system can be implemented, i.e. pick up and deposition from one of the storage bars 1, are summarized hereinafter.

Pick Up Operations

Reference shall be made to FIG. 3. For simplicity of description, reference shall be made to the case in which a series of packages C1, C2, C3, . . . , Cn are loaded on predefined transverse valleys of the storage bar 1 and must be picked up by the carrier bar 8 to be conveyed towards their final destination (such as the drawers of an external cart or a drawer of the cabinet).

When the carrier bar 8 reaches the alignment with the predetermined storage bar 1 (FIG. 3a), a command (such as pneumatic) couples the carrier bar 8 towards the storage bar 1 so that the two bars are joined at the head with alignment also ensured by the conical coupling between the two bars.

The carrier bar 8 at this point pushes the storage bar 1 and allows it to disengage from its mechanical abutments on the fixing plate, allowing it to rotate.

Optionally, during the coupling and pushing step of the two bars 1 and 8, the main comb 6 is approached, precisely dropped from above, and along with teeth 10 of the carrier bar 8, it contributes to retaining the packages possibly already present on the carrier bar 8 in a known position, preventing, for example, that the packages may "jump" from one valley to the other in the impact between the two bars due to coupling.

Upon completion of the above coupling step, the main comb 6 optionally returns to the rest position, i.e. to the raised position; with the main comb 6 thus raised, the latter is advanced in parallel and towards the storage bar 1 so as to surmount the latter.

Now, both the main 6 and the auxiliary comb 5 are again lowered to the working position and the main comb 6 helps keeping packages C1, C2, C3 on the storage bar in a known position, while the auxiliary comb 5 prevents movements and oscillations of any doses already present on the carrier bar 8, FIG. 3b.

This action is preparatory for the next step of rotation of the carrier bar 8 and, consequently, of the storage bar 1, so that both expose the smooth surface 9 upwards, which allows the translation of the doses/packages.

At this point, the translation of the packages takes place:
the auxiliary comb 5 is returned to the rest position (high),
the main comb 6 is translated from a distance functional to the handling of the packages C1 to be picked up so as to carry them on the carrier bar 8 (for example, a dose in FIG. 3c).

The length of the displacement is managed by the processor and depends on both the number of packages to be picked up and on their pitch, which in turn is a function of the package size.

Finally, once the pick up operation is complete:
the auxiliary comb 5 is lowered and positioned in its working position (low);
the carrier 8 and storage bars 1 are counter-rotated, and thus they return to the initial position, which ensures that the packages are maintained in known positions in valleys 7 of the teeth of bars 1;
both the main 6 and the auxiliary comb 5 return to their rest position by a lifting action; the main comb 6, if necessary, is fully retracted;
the carrier bar 8 is disengaged from the storage bar 1 and spaced therefrom by a dedicated command.

At this point, as needed, it is possible to convey the packages to their final destination, or repeat the operations just described to pick up other packages from the storage bars 1.

In the latter case, i.e. picking up other packages from the storage bars 1, it is contemplated to first free in the head positions of the carrier bar 8 a number of valleys that is appropriate to the number and type of packages to be picked up. This operation is performed in the following ways:

- the main comb 6, in its rest position (high), is advanced by a distance equal to the number of valleys of the carrier bar to be freed;
- the main comb 6 is lowered and positioned in its working position (low);
- the auxiliary comb 5 is lowered and positioned in its working position (low);
- the carrier bar 8 is rotated until reaching the position in which it exposes the smooth surface 9 upwards;
- the auxiliary comb 5 is raised and returned to the rest position (high);
- the main comb 6 is fully retracted; by said movement, packages C1, C2, C3 present on the carrier bar (8) are made to retract thereby freeing, at the head of the carrier bar, the number of valleys required for the subsequent pick up step;
- the auxiliary comb 5 is lowered and positioned in its working position (low);
- the carrier bar 8 is rotated until reaching the position in which it exposes ridges and valleys upwards.

Operations for the Deposition to the Final Destination

The step of conveying packages C1, C2, C3 to the final destination is carried out by another component part of the pick up and handling group (e.g. consisting of an inclined chute) so as to direct the trajectory of the packages released by the retention system.

The target container may be a drawer of a cart previously constrained to the warehouse or a drawer that is part of the warehouse itself (useful, for example, for emergency or sudden pick ups):

- In the first case, the opening of the drawer on the cart is possible due to the presence, on the pick up and handling group, of a mechanical arm actuated by means of pneumatic controls according to methods similar to those already described in U.S. Pat. No. 8,478,441.
- In the second case, the warehouse drawer exposes its opening by means of, for example, a pneumatic actuation.

In any case, the alignment between the chute and the target container of the packages is handled by the computer on the basis of appropriately defined coordinates.

Once aligned, the two combs move to their working position (low). In this configuration, the vector bar may rotate, thereby exposing the smooth part upwards without the risk that the drug packets it retains may lose their known positions.

After rotation, the auxiliary comb 5 can return to the rest position (high).

The drug packages can then be ejected from the carrier bar to the chute through a main comb translation.

The packages, conveyed by the chute itself, reach their final destination by gravity. It is noted that unlike other solutions described in the literature, in order to carry the packages from the carrier bar to the final destination, the same are conveyed from the carrier bar by gravity to the end positions via the chute on which they are dropped directly by the carrier bar.

Thus, the deposition of the doses takes place without further intermediate steps but, from the carrier bar with which they have been picked up from the warehouse, the packages are immediately conveyed to the final destination.

Moreover, amongst the advantages, this mode of ejecting the packages from the carrier bar allows a more reproducible and orderly deposition of the drug packages on the chute since they are deposited progressively one at a time on the conveyor chute, and not at the same time as in the previous solutions adopted.

This makes the process more efficient in terms of speed and accuracy according to one of the objects that inspired this innovation proposal.

It should be noted, although it is clear from the above description, that the teeth of bars 1 and 8 refer to a plurality of ridges 2 and 10 and relative valleys 3 and 7, which are obtained only on half section, with respect to a cross-sectional plane of bars 1 and 8.

Package Loading Procedure

The drug packages to be loaded, for example in a package cabinet, are temporarily placed on a plurality of loading bars 15 consisting of circular section pegs mounted horizontally to form an n×m matrix. The loading of the doses is carried out by a telescopic arm 14 provided with a suction system and some suction cups 13. This system is an integral part of the pick up and handling group. The telescopic arm 14 is able to extend towards the drug packages C4, C5, C6, C7 supported by the loading bar 15 and pick them with the suction cups 13 while the suction circuit is active.

Figure 4:
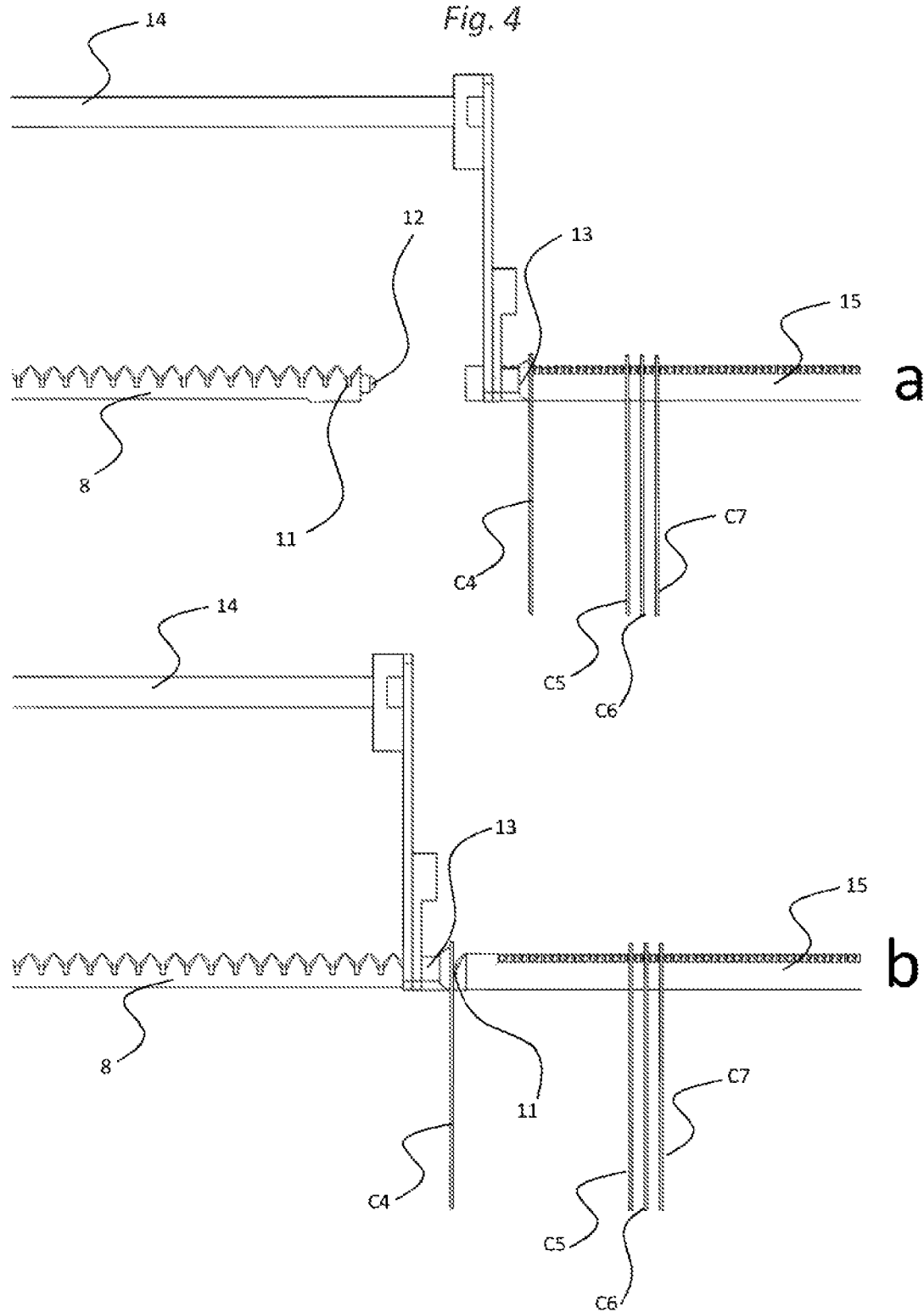
FIG. 4: shows the loading of a package, indicated by C4 on the carrier bar.

In the innovation proposal described herein, each of the loading bars 15 has a conical hole 16 at the tip useful for coupling with the conical head 12 of a carrier bar 8. The loading of a package, such as that indicated with C4, on the carrier bar 8 takes place with the steps described hereinafter and shown in FIG. 4:

- The carrier bar 8 is aligned with the loading bar 15 from which the package has to be picked up by positioning the pick up and handling group according to the coordinates defined and managed by the processor;
- Through the pick up system described above, package C4 to be loaded is picked up by the extension of a telescopic arm 14;
- The telescopic arm, with the package hanging to the suction cups 13, is retracted to the reading position. In this position, the packages to be loaded are identified, for example, the code shown on the package to be loaded can be acquired with a barcode reader. Reference shall be made to FIG. 4a;
- Similar to what described for the pick up from the storage bar, the carrier bar 8 advances towards the loading bar 15 and joins at the head with the same,
- The telescopic arm 14 further retracts to the deposition position of the package on the carrier bar. In this position, in fact, by removing the suction, package C4 is let down in the first valley 11 of the service bar. Reference shall be made to FIG. 4b;
- The telescopic arm 14 can return to its rest position and the carrier bar 8 moves away from the loading bar 15, thereby decoupling from it.

The packages thus loaded on the carrier bar are deposited on the storage bars that make up the warehouse, suitably reversing the steps of the warehouse pick up operation already described. With the above package loading procedure, the problems associated with the interface between the smooth bar, on which the packages to be loaded are hanging, and the carrier bar are overcome. The physical coupling between smooth bar and carrier bar and the use of a "service" valley positioned in the first position on the carrier bar makes the dose loading step extremely practical and reliable.

The invention claimed is:

1. A device for handling and distributing packages of objects, the device comprising:
   a. a storage bar for storing and supporting packages;
   b. a pick-up group including a carrier bar, and
   c. a handling group of the packages;
   wherein the storage bar and the carrier bar each have a plurality of ridges and relative valleys, so as to form teeth;
   wherein the storage bar and the carrier bar are configured to perform, directly or indirectly, an axial rotation with respect to their common axis, where the rotation of the carrier bar is such as to take at least two positions, in which:
      in a first rest position, the teeth are facing upwards, so as to retain the packages in relative valleys;
      in a second working position, the teeth are rotated downwards so as to expose a smooth surface of the carrier bar upwards, disengaging any packages from the relative valleys;
   a main comb configured to move the packages when the carrier bar is rotated according to the second working position;
   the main comb being configured for carrying out:
      a first translation movement, so as to bring the relative teeth of the main comb sliding on one chosen from the storage bar and the carrier bar and engage the packages,
      a second horizontal translation movement by which the packages are handled from or towards the carrier bar.

2. The device according to claim 1, and further comprising an auxiliary comb configured to hold in place the packages and prevent oscillations of the packages during passage of the carrier bar between the first rest position and the second working position and vice versa; wherein the auxiliary comb:
   a. is placed off-axis with respect to the carrier bar,
   b. works laterally to the carrier bar,
   c. is subject to a movement in a vertical direction, lowering towards the packages during operation.

3. The device according to claim 1, wherein the carrier bar is configured to additionally carry out also a rectilinear translational movement in the two directions of joining/detachment with a head of the storage bar, a free end of the carrier bar including an abutment configured to penetrate into a corresponding seat of the storage bar, when the storage bar and the carrier bar are aligned and joined at the head, a geometry of the abutment also being such as to allow an entrainment in rotation of the storage bar after coupling of the storage bar and the carrier bar.

4. The device according to claim 3, wherein the abutment includes a conical coupling geometry and also allows transmitting rotation of the carrier bar to the storage bar.

5. The device according to claim 1, wherein the carrier bar comprises a valley more than the number of valleys of the storage bar, so as to:
   a. obtain one more position on the carrier bar to temporarily receive the packages during the loading of the carrier bar, and
   b. completely empty the storage bar with a single activation of the carrier bar to reduce a number of transfers required to move a certain number of packages.

6. The device according to claim 1, wherein the main comb is arranged in axis with respect to a vertical median plane passing through the carrier bar.

7. The device according to claim 6, wherein symmetrically with respect to the plane, the main comb comprises a pair of separation elements which are repeated by an entire length thereof and which serve as a separation device adapted to keep the packages mutually separated when the carrier bar is in the second working position.

8. The device according to claim 1, wherein the main comb has an end portion shaped so as to replicate a circular shape of the carrier bar.

9. The device according to claim 1, and further comprising a support for the storage bar, the support being configured so as to allow the free axial rotation of the storage bar when pushed axially.

10. A method of handling and distributing packages of objects, preloaded or to be deposited on a toothed storage bar and picked up or deposited by a pick-up and handling group including a carrier bar; comprising:
    aligning and joining the carrier bar with the storage bar,
    pushing the carrier bar towards the storage bar so as to disengage the carrier bar, allowing rotation of the carrier bar,
    keeping the packages present on the storage bar in a known position approaching a main comb;
    rotating the carrier bar and the associated storage bar so as to expose a smooth surface upwards, disengaging the packages from teeth of at least one chosen from the storage bar and the carrier bar,
    moving the packages along from or towards the carrier bar via the main comb,
    counter-rotating the storage bar and the carrier bar and after moving the packages,
    uncoupling the storage bar and the carrier bar and,
    conveying the packages to a final destination or repeating the operations to pick up other packages.

11. The method according to claim 10, and further comprising:
    preventing movements and oscillations of the packages already present on the carrier bar, via an auxiliary comb.

12. The method according to claim 11, wherein during movement of the packages along from or towards the carrier bar via the main comb:
    the auxiliary comb is returned to a rest position;
    the main comb is translated by a distance functional to the movement of the packages to be handled,
    the length of the displacement being managed by a processor and being a function of both a number of packages to be picked up and of their pitch, which in turn is a function of a package size.

13. The method according to claim 10, and further comprising bringing the main comb close to the carrier bar even during the aligning and pushing steps and keeping any packages already present on the carrier bar in a known position.

14. The method according to claim 10, and further comprising conveying the packages to the final destination and directly releasing the packages by gravity towards a chute, in a progressive and sequential manner and without further intermediate steps to the final destination.

15. The method according to claim 10, and further comprising completely emptying the storage bar with a single activation of the carrier bar, thus reducing a number of transfers required to move a certain number of packages.

16. The method according to claim 12, wherein in case of repetition of the operations for picking up other packages, freeing a head of the carrier bar a suitable number of valleys with respect to a number and type of packages to be picked up, comprising:
- advancing the main comb, in a rest position, by a distance equal to the number of valleys of the carrier bar to be freed;
- lowering and positioning the main comb to a lower working position;
- lowering and positioning the auxiliary comb to a working position;
- rotating the carrier bar until reaching the working position in which the carrier bar exposes the smooth surface upwards;
- lifting and returning the auxiliary comb to the rest position;
- fully retracting the main comb so that by the movement, the packages present on the carrier bar are retracted, thereby freeing, at the head of the carrier bar, the number of valleys required for the subsequent pick up step;
- lowering the auxiliary comb to the working position;
- rotating the carrier bar until reaching the position in which the carrier bar exposes ridges and valleys upwards.

17. The package storage unit comprising the device according to claim 1.

* * * * *